(12) United States Patent
Dialinakis

(10) Patent No.: US 7,151,443 B2
(45) Date of Patent: Dec. 19, 2006

(54) OPTICAL TRAILER HITCH LOCATOR

(76) Inventor: Theodoros N. Dialinakis, 2645 Beaumont Ct., Clearwater, FL (US) 33761

( * ) Notice: Subject to any disclaimer, the term of this patent is extended or adjusted under 35 U.S.C. 154(b) by 169 days.

(21) Appl. No.: 10/926,923

(22) Filed: Aug. 26, 2004

(65) Prior Publication Data

US 2006/0044122 A1    Mar. 2, 2006

(51) Int. Cl.
*G08B 21/00* (2006.01)

(52) U.S. Cl. .................... 340/431; 340/435; 340/531; 340/471; 340/472; 340/442; 340/686.2; 348/148

(58) Field of Classification Search ............... 340/431, 340/435, 531, 471, 472, 442, 686.2; 348/148
See application file for complete search history.

(56) References Cited

U.S. PATENT DOCUMENTS

| | | | |
|---|---|---|---|
| 4,938,495 A | 7/1990 | Beasley et al. | |
| 5,455,557 A | 10/1995 | Noll et al. | |
| 5,513,870 A | 5/1996 | Hickman | |
| 5,650,764 A | 7/1997 | McCullough | |
| 5,729,194 A | 3/1998 | Spears et al. | |
| 5,861,814 A | 1/1999 | Clayton | |
| 6,100,795 A | 8/2000 | Otterbacher et al. | |
| 6,178,650 B1 | 1/2001 | Thibodeaux | |
| 6,222,457 B1 * | 4/2001 | Mills et al. ............... | 340/686.1 |
| 6,259,357 B1 | 7/2001 | Heider | |
| 6,480,104 B1 | 11/2002 | Wall et al. | |
| 6,970,184 B1 * | 11/2005 | Hirama et al. ............... | 348/148 |
| 2003/0234512 A1 * | 12/2003 | Holub ........................ | 280/432 |

* cited by examiner

*Primary Examiner*—Tai Nguyen
(74) *Attorney, Agent, or Firm*—Larson & Larson; Herbert W. Larson

(57) ABSTRACT

A vision sensor mounted above a hitch ball attached to a vehicle detects a colored magnet mounted on a trailer hitch and transmits the visual signal to a processor mounted within the vehicle operated by a power source such as the vehicle's 12 volt D.C. battery. The processor assimilates the sensor's signal and indicates the location of the trailer hitch on a display screen mounted on the dashboard of the vehicle. As the vehicle driver backs his vehicle to place the trailer hitch signal on the ball signal, the actual ball on the vehicle ends up under the trailer hitch.

15 Claims, 4 Drawing Sheets

OPTICAL TRAILER HITCH LOCATOR

BACKGROUND OF THE INVENTION

This invention relates to trailer hitch locators. More specifically, it refers to an optical sensor system for assisting a backing motor vehicle operator in aligning a hitch ball on the rear of the vehicle to a trailer hitch.

The task of aligning a vehicle ball with a trailer hitch is a difficult and sometimes frustrating one. Many systems have been developed in the prior art in an attempt to make this alignment task easier. Magnetically activated electrical switches were describe in U.S. Pat. No. 5,108,123. Other magnetic coupling devices were described in U.S. Pat. Nos. 5,729,194; 5,861,814 and 6,178,650. A recent development employs an infrared light and sensor mounted on the bumper of the towing vehicle. A reflective device on the trailer hitch returns infrared light impulses back to the sensor which transmits audible signals to the driver. See U.S. Pat. No. 6,259,357. In U.S. Pat. No. 6,480,104, a multiplicity of ultrasonic transducers gauge the location of the towing vehicle to the trailer. The information is transmitted to a control unit which creates a visual display for the operator. While these recently developed systems improve the ability of a driver to align his vehicle with a trailer hitch, they are expensive and the data furnished to the driver is difficult to interpret. A simpler inexpensive system is needed to assist a driver in quickly and easily aligning his vehicle to a trailer hitch.

SUMMARY OF THE INVENTION

The present invention provides a simple and less expensive system to assist a driver in aligning his vehicle with a trailer hitch. A display screen is mounted on the dashboard of the driver's vehicle. The display screen is connected through a processing element operated by a power source such as the vehicle's power source, to a vision sensor mounted behind and above a hitch ball attached to the rear of the vehicle. The vision sensor detects a brightly colored magnet or sticker attached to the trailer hitch and transmit the data to the processor. The processor creates X and Y coordinates on the display screen showing the relative angle and distance from the trailer hitch of the vehicle's hitch ball. As the vehicle is backed down the driver looks at the display screen and is easily directed to the exact position of the hitch ball under the trailer hitch.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
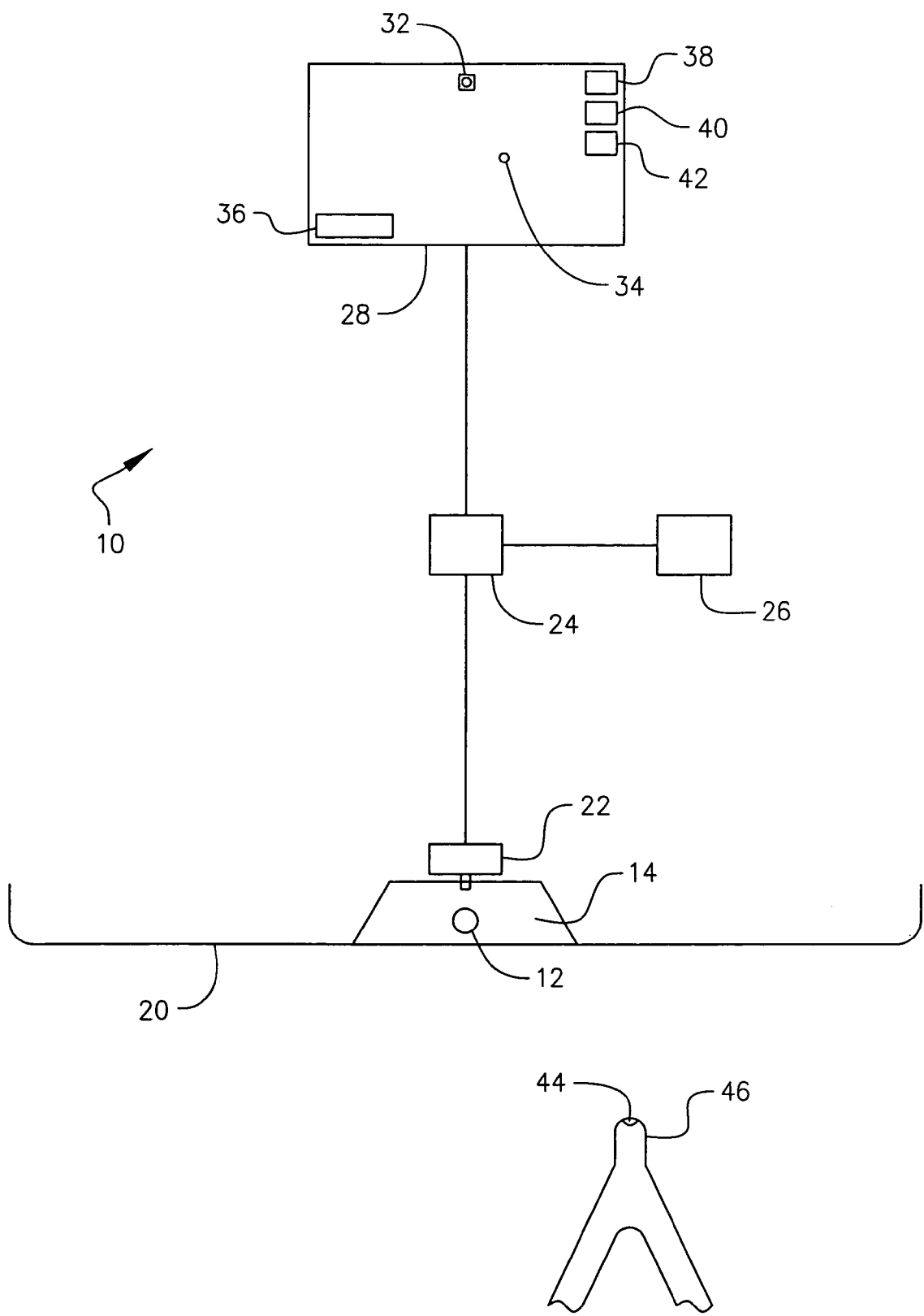
FIG. 1 is a schematic presentation of the optical trailer hitch locator of this invention.
Figure 2:
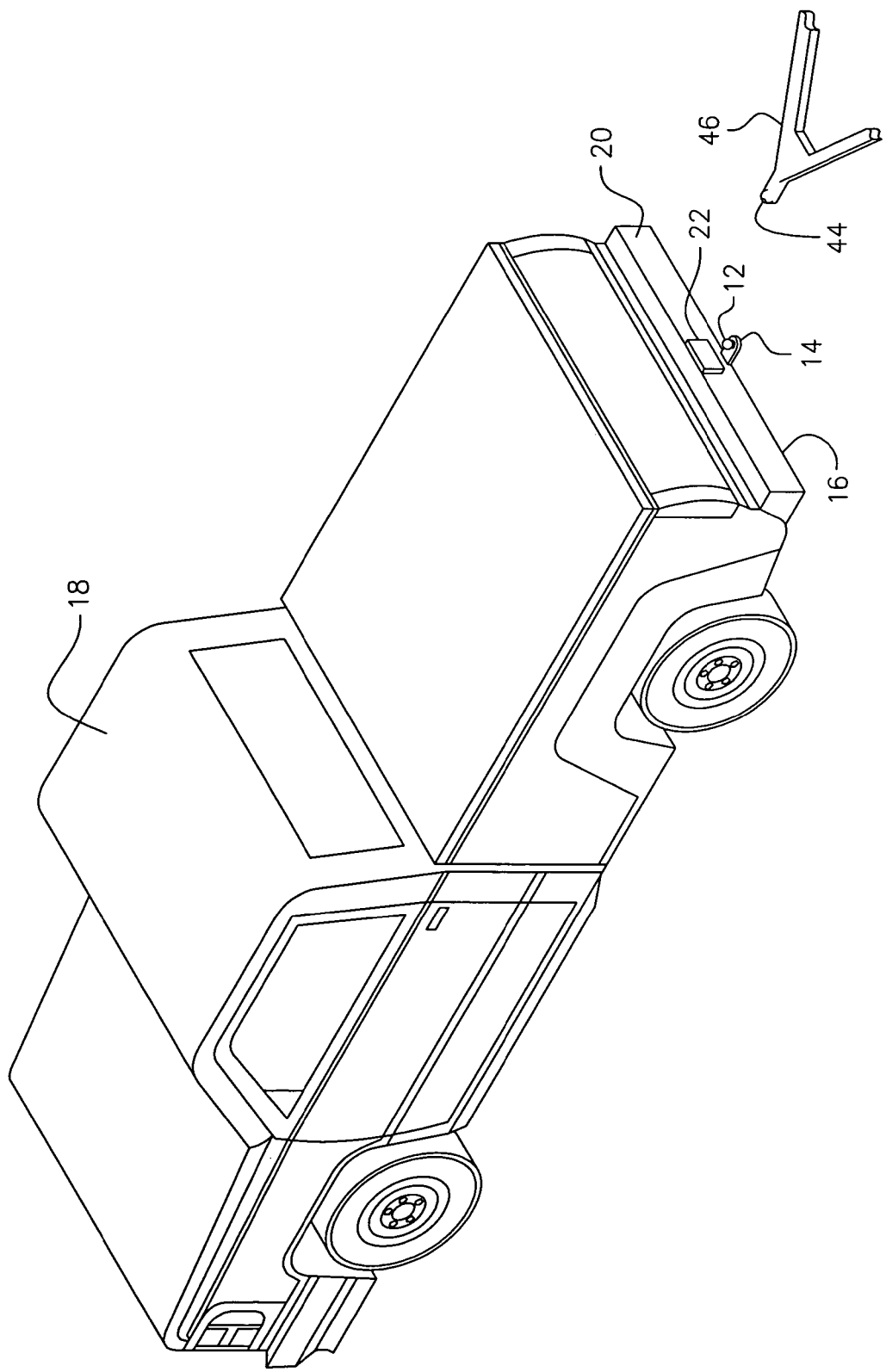
FIG. 2 is a perspective view of a backing motor vehicle heading towards a trailer hitch.
Figure 3:
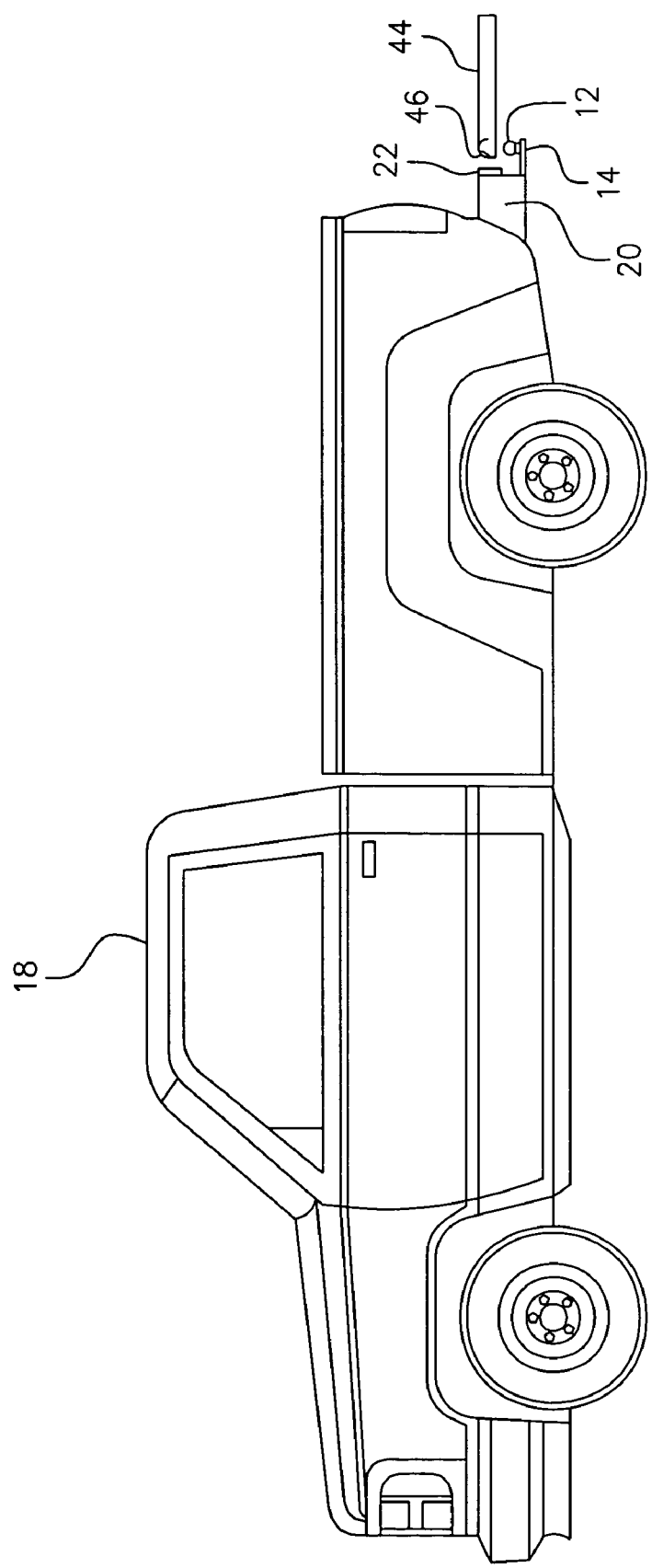
FIG. 3 is a side view in elevation showing the ball aligned under the trailer hitch.
Figure 4:
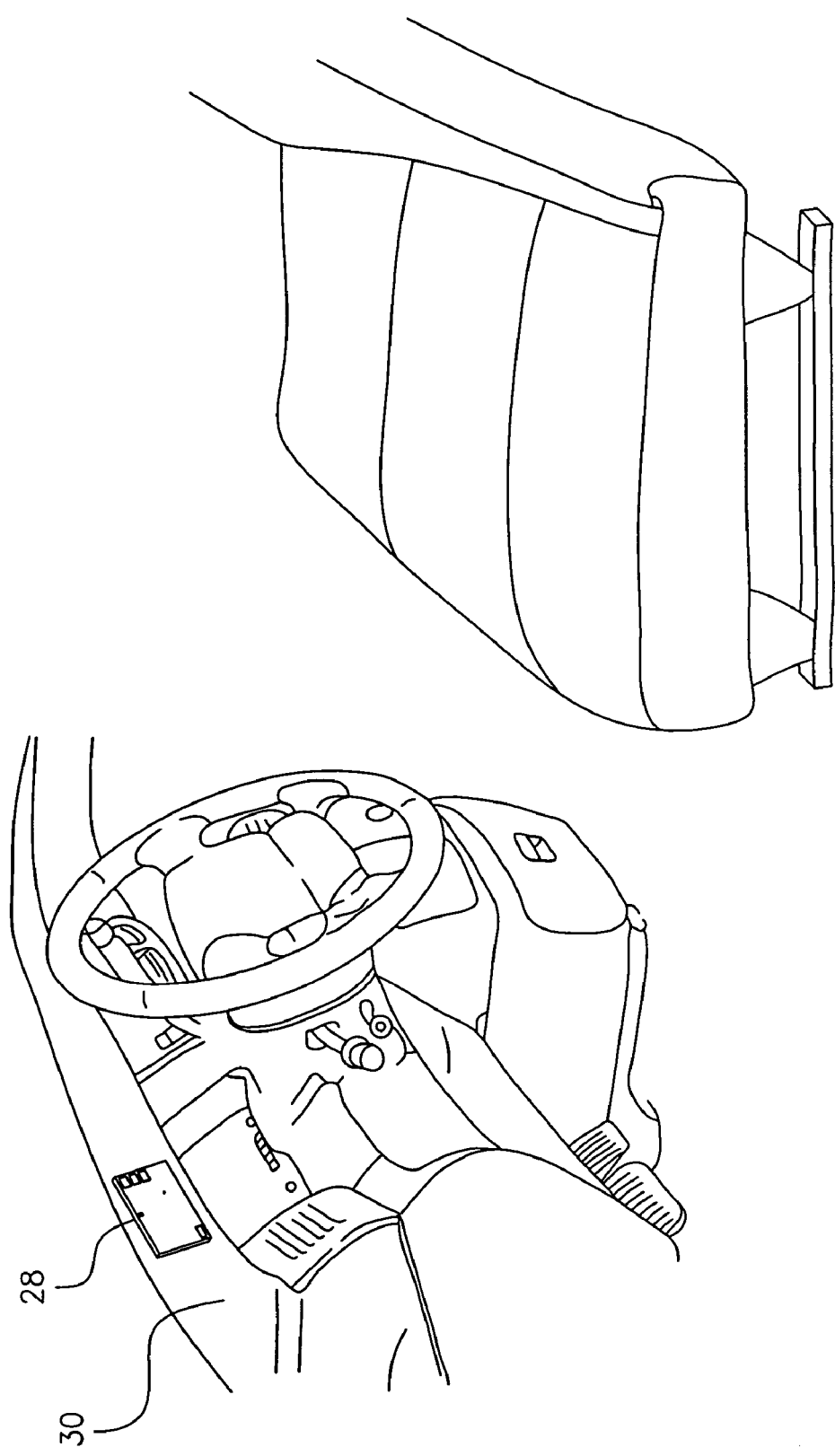
FIG. 4 is a perspective view of LCD display on a dashboard of the vehicle.

Throughout the following detailed description, the same reference numerals refer to the same elements in all figures.

Referring to FIG. 1, the optical trailer hitch locator 10 of this invention has a standard hitch ball 12 mounted behind bumper 20 to a bracket 14, usually welded or bolted to the undercarriage frame 16 of a pulling vehicle 18. A vision sensor 22 containing a video camera (not shown) interfaced to a microcontroller (not shown) is mounted to the vehicle slightly above the ball 12.

The vision sensor 22 is in electrical contact with a processor 24 mounted within the vehicle and powered by the vehicle's power source such as a 12 volt D.C. power 26. Alternatively, the processor can have a self contained battery. The processor assimilates the signal sent from the vision sensor 22 and prints out a signal shown on a display screen 28 mounted on the dashboard 30 of the vehicle. The display screen 28 shows indicia 32 for the ball and additional indicia 34 for the trailer hitch. In addition, the screen has a distance 36 printout and a set circle 38, reset circle 40 and color menu 42. The display screen 28 is a liquid crystal display (LCD) or equivalent display device.

The vision sensor 22 tracks a brightly colored magnet or sticker 44 attached to the trailer hitch 46. The color of the magnet or sticker is consistent with the selection in menu 42. The sensor 22 gathers spatial information about the tracked magnet or sticker 44 and sends the data to the processor 24 for analysis.

The vision sensor 22 is a complimentary metal oxide semi-conductor (CMOS) video camera interfaced to a microcontroller that performs a basic color-tracking function. An example is the CMU cam developed by Carnegie Mellon University.

The processor 24 controls the vision sensor 22 and the display screen 28. The processor 24 receives object-tracking data from the vision sensor 22, analyzes the tracking data and calculates the distances from the ball 12 to the trailer hitch as X, Y coordinates and draws the coordinates on the display screen 28.

The display screen 28 receives drawing instructions from the processor 24 and draws the requested data. The horizontal distance between the trailer hitch 46 and the ball 12 is represented as an X coordinate and the vertical distance between the trailer hitch 46 and the ball 12 is represented as a Y coordinate. This X-Y coordinate pair is drawn on the display screen 28 as seen in FIG. 1. The driver then backs his vehicle 18 so that the trailer hitch indicia 34 moves over the ball indicia 32. On the display screen 28 the ball indicia 32 is square and the trailer hitch indicia 34 is round.

In operation, the driver places a colored magnet such as an orange magnet 44 on the ball 12 and pushes the set circle 38. The orange magnet 44 is then placed on the trailer hitch and the reset circle 40 is pushed to start the system. By backing the vehicle in the correct direction as shown on the display screen 28 the driver will place the ball 12 under the trailer hitch 46 when the square and circle on the display screen 28 coincide.

Other equivalent elements can be substituted for the elements disclosed herein to produce substantially the same results in substantially the same way.

Having described the invention, what is claimed for Letters Patent follows:

1. A trailer hitch locator system for coupling a towing vehicle ball to a trailer hitch, the system comprising:

the towing vehicle ball mounted on a bracket attached to a vehicle, the ball projecting outwardly from a rear bumper of the vehicle;

a vision sensor mounted to the vehicle above the ball and sending a signal outwardly from the ball;

a trailer hitch with a brightly colored device mounted on a forward surface;

a processor powered by a power source, the processor receiving incoming signals from the vision sensor and transmitting a visual signal to a display screen mounted within a driver's space in the vehicle; and the display screen showing indicia representing the ball and the trailer hitch, a distance of the ball to the trailer hitch and operational sites comprising a set circle, a reset circle and a color menu.

2. The trailer hitch locator system according to claim 1 wherein the brightly colored device mounted on the trailer hitch is a brightly colored magnet.

3. The trailer hitch locator system according to claim 1 wherein the brightly colored device mounted on the trailer is brightly colored sticker.

4. The trailer hitch locator system according to claim 1 wherein the ball indicia is in a fixed position on the display screen and the trailer hitch indicia moves as the vehicle moves in relation to the trailer hitch.

5. An apparatus for aligning a hitch ball mounted to a portion of a towing vehicle to a trailer hitch, the apparatus comprising:

a vision sensor mounted to the towing vehicle above the hitch ball;

a trailer hitch with a brightly colored device mounted on a forward surface adapted to receive a hitch ball;

a processor powered by a power source, the processor mounted within the towing vehicle, the processor receiving incoming signals from the vision sensor and transmitting a visual signal to a display screen mounted within a driver's space in the vehicle;

the display screen showing indicia representing the ball and the trailer hitch, so that when a driver backs the vehicle, the trailer hitch indicia moves with respect to the ball indicia to indicate the distance and angle of the ball from the trailer hitch, the display screen further showing operational sites comprising a set circle, a reset circle and color menu.

6. The apparatus according to claim 5 wherein the brightly colored device mounted on the trailer hitch is a magnet.

7. The apparatus according to claim 5 wherein the brightly colored device mounted on the trailer hitch is a sticker.

8. The apparatus according to claim 5 wherein the power source is a D.C. battery powering the processor.

9. The apparatus according to claim 5 wherein the power source is a 12 volt vehicle battery powering the processor.

10. The apparatus according to claim 5 wherein the display screen is mounted on a dashboard of the towing vehicle.

11. A method of coupling a hitch ball mounted on a rear portion of a towing vehicle to a trailer hitch, the method comprising:

mounting a vision sensor in the vehicle above the hitch ball;

mounting a brightly colored device on a forward surface of the trailer hitch after first mounting the brightly colored device on the hitch ball and pressing a set circle on a display screen mounted within a cab of the towing vehicle;

pressing a reset circle on the display screen after mounting the brightly colored device on the trailer hitch;

providing a processor powered by a power source, the processor mounted within the towing vehicle and receiving signals from the vision sensor;

the processor sending a signal to the display screen to indicate a signal for a position of the trailer hitch with respect to a signal for the hitch ball;

a driver in the towing vehicle backing the towing vehicle to cause the position of the trailer hitch signal to coincide with the hitch ball signal so that the hitch ball is positioned under the trailer hitch.

12. The method according to claim 11 wherein the brightly colored device is provided as a magnet.

13. The method according to claim 11 wherein the brightly colored device is provided as a sticker.

14. The method according to claim 11 wherein the display screen is mounted on a dashboard of the cab.

15. The method according to claim 11 wherein the processor power source is a battery providing power to the towing vehicle.

* * * * *